United States Patent [19]
Maughan

[11] Patent Number: 6,042,293
[45] Date of Patent: Mar. 28, 2000

[54] LOW TORQUE BALL AND SOCKET JOINT ASSEMBLY

[75] Inventor: Garth B. Maughan, Delta, Ohio

[73] Assignee: Dana Corporation, Toledo, Ohio

[21] Appl. No.: 09/052,186

[22] Filed: Mar. 31, 1998

[51] Int. Cl.⁷ .................................................. F16C 11/00
[52] U.S. Cl. ........................... 403/135; 403/137; 403/140
[58] Field of Search ................................... 403/135, 137, 403/140, 133, 132, 122; 384/192, 203, 206, 209, 210, 213

[56] References Cited

U.S. PATENT DOCUMENTS

| | | | |
|---|---|---|---|
| 2,973,980 | 3/1961 | Vogt et al. | 403/133 |
| 3,226,141 | 12/1965 | Sullivan, Jr. . | |
| 3,411,815 | 11/1968 | Sullivan, Jr. . | |
| 4,101,228 | 7/1978 | Scheerer . | |
| 4,318,627 | 3/1982 | Morin . | |
| 4,353,660 | 10/1982 | Parks | 403/135 X |
| 4,430,016 | 2/1984 | Matsuoka et al. | 403/135 X |
| 4,995,755 | 2/1991 | Hyodo et al. . | |
| 5,067,841 | 11/1991 | Fukukawa et al. | 403/140 |
| 5,564,853 | 10/1996 | Maughan . | |
| 5,772,337 | 6/1998 | Maughan et al. | 403/137 X |

Primary Examiner—Lynne H. Browne
Assistant Examiner—Paco S Freire
Attorney, Agent, or Firm—Rader, Fishman & Grauer PLLC

[57] ABSTRACT

An annular bearing set for a ball and socket joint includes annular inner and outer bearings that has a head of a ball stud engaging an inner seat face of each of the bearings. An axial compression preload results when the bearing set and ball stud are inserted into a socket and the socket is closed. The seat face of the outer bearing is provided with a plurality of compliance grooves and lubrication grooves. The inner bearing is also provided with lubrication grooves. The grooves permit the preloaded bearing set to relax during a predetermined time period, thereby producing a joint that has low torque and low end motion. The bearings are further provided with an alignment mechanism for aligning the lubrication grooves of the inner and outer bearings.

19 Claims, 2 Drawing Sheets

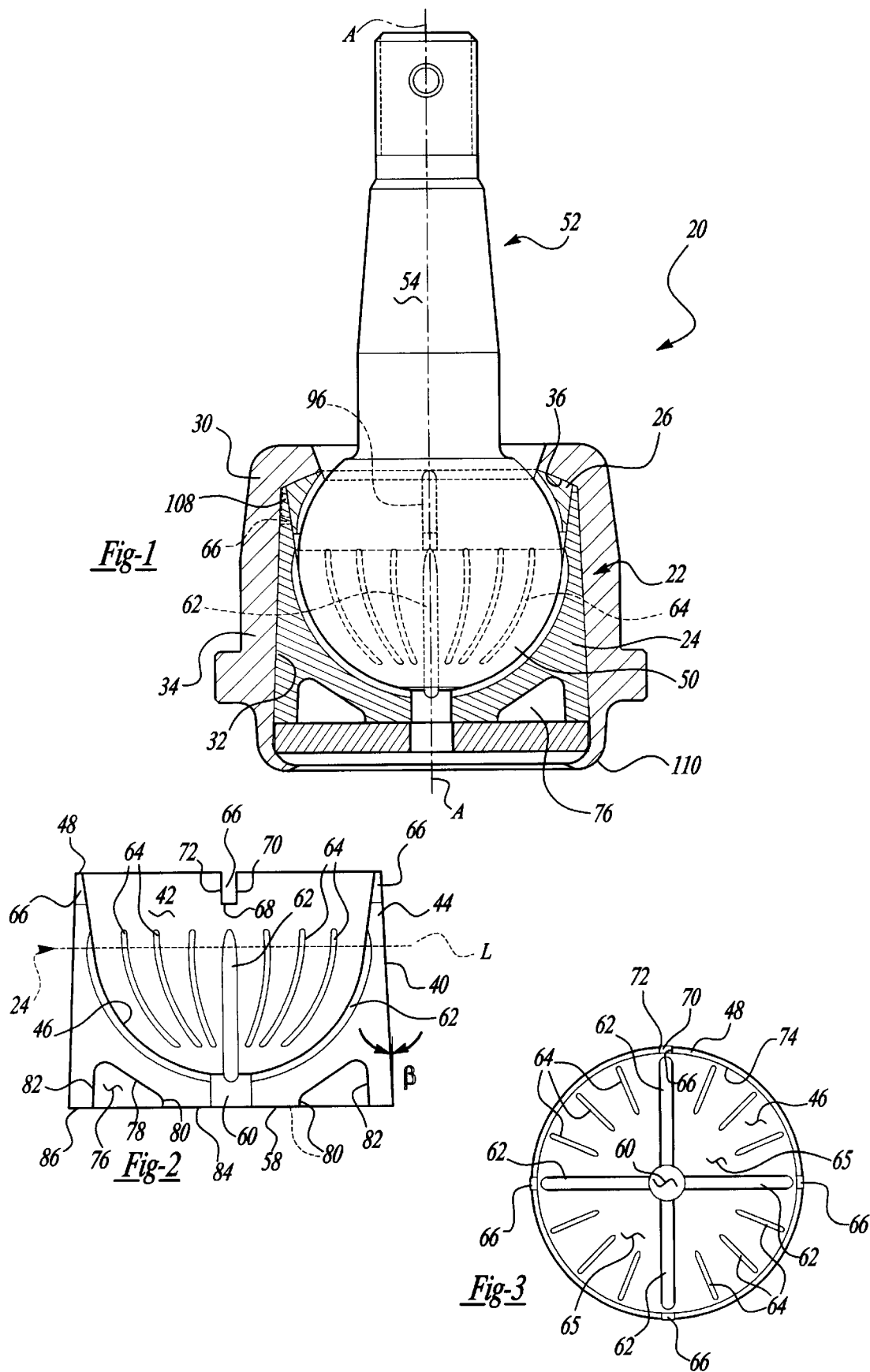

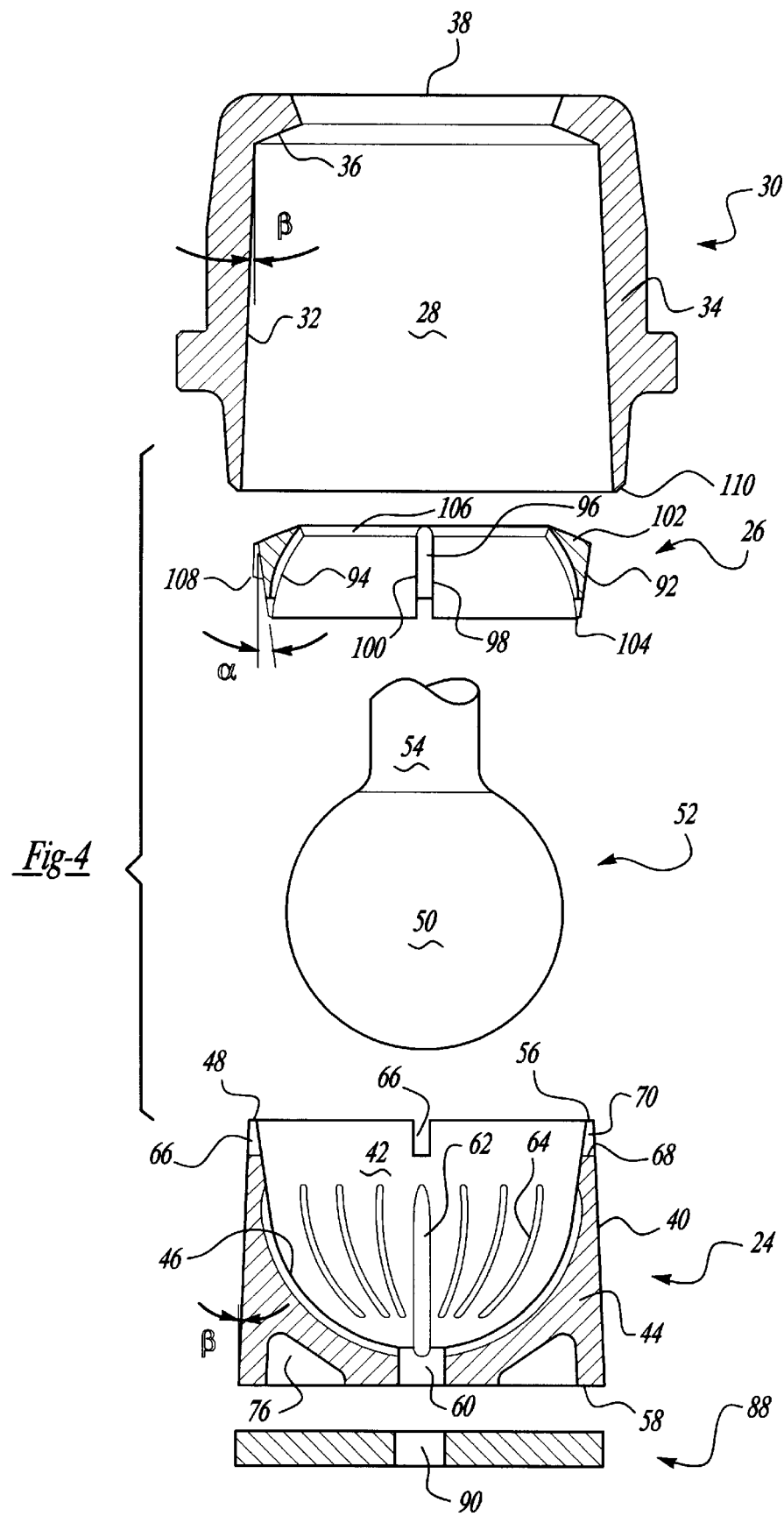

LOW TORQUE BALL AND SOCKET JOINT ASSEMBLY

FIELD OF THE INVENTION

The present invention relates generally to ball and socket joint assemblies. More particularly, the invention relates to an annular two-piece bearing set that engages the head of a ball stud when retained within a socket under a compression pre-load wherein a plurality of grooves provide a joint having low torque and low end motion for the ball stud.

BACKGROUND OF THE INVENTION

Ball and socket joints are used in a variety of applications, including rack and pinion inner tie rod socket assemblies, steering knuckles, drag links, and connecting rod assemblies. Ball and socket joints typically include a generally cylindrical socket member adapted to receive one or more bearings together with a head of a ball stud. The bearing reduces the degree of friction between the socket and ball stud head and is sometimes used to compensate for wear between the stud and socket member by way of a compression preload. However, a small degree of friction is necessary for the ball joint to operate smoothly.

Current light-weight vehicle designs dictate the use of low friction plastic bearings for steering and suspension ball and socket joints. The use of plastic bearings provide a significant increase in load shock dampening capability and system compliance than previous known metal bearing joints. However, there are drawbacks to the use of plastic bearings. A significant amount of assembly pre-load force must be exerted against the plastic material to obtain low end motion of the stud. However, low end motion results in higher torque values.

To achieve a low stud rotating torque value, a lower assembly preload can be utilized but this results in unacceptably high end motion of the stud. In an effort to achieve a low torque, low end motion ball and socket joint, bearings are known which incorporate additives such as polytetrafluoroethylene (PTFE), or the like, to reduce friction, and thereby permit the use of significant preloads to control the level of end motion. Such bearings are only marginally successful in producing low torque and low end motion ball and socket joints. Further, the use of additives undesirably increases manufacturing costs.

SUMMARY OF THE INVENTION

The present invention is directed to an improved ball and socket joint which includes an annular two-piece bearing set that results in a joint having a low torque and low end motion of a ball stud.

The two-piece bearing set comprises annular inner and outer bearings with opposing axial surfaces and cooperating seat faces. The outer bearing includes a generally cylindrical wall section that defines a cavity. A hemispherical seat face within the cavity engages a head of a ball stud. A radial compressive preload is applied when the inner bearing is inserted into the cavity of the outer bearing such that a spherical seat face of the inner bearing engages the head of the ball stud. The inner bearing has a generally cylindrical outer peripheral surface with an unloaded diameter greater than a corresponding unloaded diameter of the wall section of the outer bearing.

The bearing set is retained within a socket and the socket is then closed to apply an axial compression preload upon both bearings. To relax the compression preload and equalize the joint, the outer bearing is provided with a plurality of compliance grooves and lubrication grooves on the seat face. The grooves allow for creep of the bearing material under load. The lubrication grooves also serve to permit the flow of lubricant to the joint. In the preferred embodiment, the assembled joint undergoes a relaxation phase for the preload for approximately seventy-two hours prior to use, thus producing a low torque and low end motion ball and socket joint without the addition of high cost material additives.

The inner bearing is also provided with lubrication grooves to aid in lubrication the joint. Disposed on the outer peripheral surface of the inner bearing is at least on locator tab. The locator tab selectively engages a notch that is provided on the first axial surface of the outer bearing. The notches and the locator tab cooperate to insure proper alignment of the lubrication grooves in the inner and outer bearings.

BRIEF DESCRIPTION OF THE DRAWINGS

The features and inventive aspects of the present invention will become more apparent upon reading the following detailed description, claims, and drawings, of which the following is a brief description:

FIG. 1 is a longitudinal view of a ball and socket assembly according to the present invention.

FIG. 2 is a longitudinal view of an outer bearing.

FIG. 3 is a plan view of the interior of the outer bearing.

FIG. 4 is an exploded longitudinal view of the ball and socket assembly.

DETAILED DESCRIPTION OF PREFERRED EMBODIMENTS

A re-greaseable, top closure ball and socket joint 20 is shown in FIGS. 1–4. Joint 20 includes an annular two piece bearing set 22 comprising an annular outer bearing 24 and an annular inner bearing 26. Bearings 24 and 26 are received in a cavity 28 of a socket 30. Cavity 28 is defined by an inner peripheral surface 32 of a socket side wall 34 and a partial spherical floor 36. Socket side wall 34 has a slight predetermined angle β with respect to an axis parallel to axis of symmetry A—A. Socket 30 further includes an aperture 38 in floor 36.

Outer bearing 24 includes an outer peripheral surface 40. Outer peripheral surface 40 is also slightly tapered to a predetermined angle β so as to conform to inner peripheral surface 32 of cavity 28. A cavity 42 is defined within outer bearing 24 by a generally cylindrical wall 44 which extends about axis A—A of socket cavity 28. Cavity 42 includes a hemispherical seat face 46 that flares outwardly toward a first axial surface 48 such that the cross-section of wall 44 is shaped generally like a cuneiform or isosceles triangle, in cross-section. Seat face 46 defines an inner peripheral surface of bearing 24. Seat face 46 engages a spherical stud head 50 of a ball stud 52. A shank 54 of ball stud 52 passes through an aperture 56 such that stud head 50 engages seat face 46.

To aid in lubrication of joint 20, a second axial surface 58 includes an opening 60 which extends through approximately the center of cylindrical wall 44 to seat face 46. Opening 60 is adapted to receive a grease fitting (not shown) for supplying lubricant to re-grease joint 20. Seat face 46 further includes a plurality of axially extending lubrication grooves 62. Lubrication grooves 62 extend from opening 60 to slightly above a centerline ℓ of bearing 24. Outer bearing 24 further includes a plurality of equally spaced apart compliance grooves 64 disposed on seat face 46. Compliance grooves 64 are relatively shallow as compared to lubrication grooves 62 and allow for creep when bearing 24 and ball stud 52 are assembled within cavity 28 of socket 30. Compliance grooves 64 are disposed on only a portion of seat face 46 so as to provide an adequate support area 65 for axial load support of stud head 50.

Bearing 24 also includes a plurality of notches 66 disposed on first axial surface 48. Notches 66 are generally aligned with, but do not intersect lubrication grooves 62. Each notch 66 includes a floor 68 and parallel opposing side walls 70 and 72 generally perpendicular to floor 68. Preferably, each notch 66 defines a constant width between side walls 70 and 72 before being compression preloaded. Notches 66 intersect an inner periphery 74 of aperture 56.

A circular channel 76 is formed within second axial surface 58. Channel 76 is defined by a floor 78 and parallel opposing side walls 80 and 82. Side wall 80 is somewhat shorter than side wall 82 such that floor 78 is angled. The portion of second axial surface 58 disposed between side wall 80 and opening 60 provides a support base 84. A peripheral support ring 86 is formed adjacent to side wall 82.

Support base 84 and support ring 86 act as a compression members to engage a sealing washer 88. Sealing washer 88 is generally formed from steel. Sealing washer 88 includes an opening 90 that is aligned with and generally the same shape and size as opening 60 to provide lubricant to joint 20.

Inner bearing 26 is radially compressed by being forced into cavity 42 of outer bearing 24. Inner bearing 26 includes a generally cylindrical outer peripheral surface 92, an unloaded diameter of which is greater than the corresponding unloaded diameter of wall 44 of outer bearing 24. Outer peripheral surface 92 is slightly tapered to a predetermined angle α with respect to axis A—A so as to conform to wall 44 of cavity 42 of outer bearing 24. Inner bearing 26 also includes a spherical seat face 94. Seat face 94 engages stud head 50 after inner bearing 26 is mated with outer bearing 24. Seat faces 46 and 94 of outer and inner bearings 24 and 26, respectively, share a common diameter and secure stud head 50 to limit its degrees of freedom to rotational motion about a common center point.

To aid in lubrication, seat face 94 further includes a plurality of axially extending lubrication grooves 96. Lubrication grooves 96 are defined by parallel opposing side walls 98 and 100. Side walls 98 and 100 extend from a first axial surface 102 to a second opposing axial surface 104. When outer bearing 24 and inner bearing 26 are mated together, lubrication grooves 62 are aligned with lubrication grooves 96 to provide a continuous lubrication path within bearing set 22.

First axial surface 102 of bearing 26 has a partial spherical shape that conforms to floor 36 in socket 30. An aperture 106 is formed within first axial surface 102 to permit shank 54 to pass through when joint 20 is fully assembled. To insure alignment of lubrication grooves 62 and 96, at least one locator tab 108 is positioned adjacent first axial surface 102 along outer peripheral surface 92. Locator tab 108 engages notch 66 on outer bearing 24. Preferably, each notch 66 is sized to have a slightly greater width and depth than a corresponding width and length of a mating locator tab 108 to allow quick assembly of bearing set 22.

A cross-sectional view of the assembled ball and socket joint 20 is illustrated in FIG. 1. First, shank 54 is passed through aperture 56 of outer bearing 24 such that stud head 50 contacts face 46. Inner bearing 26 is then forced into cavity 42 until seat face 94 of inner bearing 26 contacts stud head 50. Bearing set 22 and ball stud 52 are then inserted into cavity 28 of socket 30 with shank 54 passing through aperture 38 of the socket, and first axial surface 102 of inner bearing 26 contacting floor 36 of socket 30. Sealing washer 88 is positioned in contact with second axial surface 58 of outer bearing 24. An axial load is applied to sealing ring 88 which is transferred to support base 84 and support ring 86 of outer bearing 24 to provide an axial compression "press-fit" preload to bearing set 22. Once ball and socket joint 20 components are properly positioned, an annular lip 110 of socket 30 is crimped about sealing washer 88, thereby closing socket 30. Lip 110 is sized to ensure adequate resistance against severe loading "push out."

Once joint 20 is assembled and preloaded, compliance grooves 64, channel 76, notches 66 and lubrication grooves 62 and 96 allow for a predetermined time period of creep of bearing set 22 material. The creep serves to partially relax the preload, thereby producing a joint that achieves low torque of ball stud 52 and low end motion. Low end motion results in increased functional wear life, and thus, increased durability of joint 20. The spherical shape of socket floor 36 permits greater material creep under load than an angled surface or a 90° cornered surface as well as better torque control of ball stud 52. Therefore, bearing set 22 provides for a balanced, controlled equilibrium between assembled, preloaded bearing set 22 and mating ball stud 52 and socket 30. In the preferred embodiment, preload relaxation to equilibrium occurs within seventy-two (72) hours of assembly of joint 20.

Joint 20 is applicable to a wide range of applications, including, but not limited to, rack and pinion inner and outer tie rod socket assemblies, upper and lower suspension ball joint assemblies, drag links and connecting rod assemblies, and other "ball and socket" steering knuckles. Outer and inner bearings 24 and 26 may be formed from a wide range of materials, depending on the individual application and the appropriate internal assembly force retention required during usage. Preferably, bearing set 22 of the present invention is constructed of a semi-rigid plastic material.

The number, spacing, and the axial extend of grooves 62, 64, 96, notches 66 and channel 76 depends on the particular application. Enough material must be removed to allow material "flow" to permit creep after initial compression preloading to produce the desired equilibrium. Yet, sufficient material must remain to provide a tailored cushioning effect with adequate compression preloading and dynamic stability to the ball stud. Thus, no compliance groove 64 or notch 66 should be aligned with an axially extending lubrication groove 62, 96 formed in the seat face of a bearing. Otherwise, assembly performance may be compromised.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A bearing set for a ball and socket joint, comprising:
an annular outer bearing having an outer peripheral surface, a first axial surface, a second axial surface, wherein said first and second axial surfaces are opposing, a generally cylindrical wall defining a cavity, a hemispherical seat face within said cavity, at least one of a notch and a locator tab positioned between said outer peripheral surface and said first axial surface, said hemispherical seat face having at least one lubrication groove and a plurality of compliance grooves; and an annular inner bearing having an outer peripheral surface, two opposing axial surfaces, a spherical seat face, at least one lubrication groove, and at least one of the other of said notch and said locator tab, said tab receivable in said notch to align said lubrication grooves of said inner and outer bearings when said bearings are mated together, said outer peripheral surface of said annular inner bearing having an unloaded diameter greater than a corresponding unloaded diameter of said hemispherical seat face such that a preload results when said inner bearing is forced into said cavity of said outer bearing.

2. The bearing set of claim 1, further including a circular channel formed of two parallel opposing side walls with a floor therebetween, said channel disposed on said second axial surface of said outer bearing.

3. The bearing set of claim 2, wherein one of said two parallel opposing side walls is longer than the other such that said floor angled therebetween.

4. The bearing set of claim 1, wherein said hemispherical seat face of said outer bearing flares outward at said first axial surface.

5. The bearing set of claim 1, wherein said notch is formed from parallel opposing side walls with a floor therebetween, said side walls spaced apart so as to form said notch with a width larger than the width of said tab.

6. The bearing set of claim 1, wherein said notch is formed with a depth that is greater than the length of said tab.

7. The bearing set of claim 1, wherein said one of said axial surfaces of said inner bearing has a spherical shape.

8. The bearing set of claim 1, wherein said compliance grooves are equally spaced apart about a central axis.

9. The bearing set of claim 8, wherein said compliance grooves end slightly above a center line of said outer bearing and do not intersect said lubricant groove.

10. The bearing set of claim 1, wherein said outer peripheral surface of said outer bearing is tapered such that the radius of said first axial surface is smaller than the radius of said second axial surface.

11. The bearing set of claim 10, wherein said outer peripheral surface of said inner bearing is tapered.

12. A bearing set for a ball and socket joint, comprising:

an annular outer bearing having an outer peripheral surface, a first axial surface, a second axial surface, said axial surfaces opposing, a generally cylindrical wall defining a cavity, a hemispherical seat face, said hemispherical seat face formed so as to flare outward at said first axial surface, a plurality of one of notches and locator tabs positioned between said outer peripheral surface and said first axial surface, and a circular channel disposed on said second axial surface, wherein said channel has an angled floor, said hemispherical seat face having a plurality of lubricant grooves and a plurality of compliance grooves wherein said compliance grooves do not intersect said lubrication grooves, and an annular inner bearing having an outer peripheral surface, two opposing axial surfaces wherein one of said opposing axial surfaces has a spherical shape, a spherical seat face, a plurality of lubricant grooves, and at least one of the other of said notches and said locator tabs such that said tab is receivable in said notch to align said lubricant grooves of said inner and outer bearings when said bearings are mated together, said outer surface having an unloaded diameter greater than a corresponding unloaded diameter of said hemispherical seat face such that a preload results when said inner bearing is forced into said cavity of said outer bearing.

13. The bearing set of claim 12, wherein said outer peripheral surfaces of said inner and outer bearing are tapered, said inner bearing tapered inversely relative to said outer bearing.

14. The bearing set of claim 12, wherein said notches are formed with a depth that is greater than the length of said tab and a width that greater than the width of said tab.

15. The bearing set of claim 12, wherein said compliance grooves are disposed substantially in the center of said hemispherical seat face so as to form a clear support area.

16. A ball and socket joint comprising:

a socket;

an annular outer bearing being axially compressed within said socket, said outer bearing having an outer peripheral surface, a first axial surface, a second axial surface, wherein said first and second axial surfaces are opposing, a generally cylindrical wall defining a cavity, a hemispherical seat face, and a circular channel disposed on said second axial surface, said hemispherical seat face having at least one lubrication groove and a plurality of compliance grooves, wherein said compliance grooves do not intersect said lubrication groove;

an annular inner bearing received within said outer bearing, said inner bearing having an outer peripheral surface, two opposing axial surfaces, a spherical seat face, and at least one lubrication groove; and a ball stud with a stud head and a shank, said stud head engaging said hemispherical seat face and said spherical seat face;

wherein said compliance grooves, lubrication grooves, and channel of said assembled inner and outer bearings allowing for creep of said bearings for a predetermined time period to partially relax the compression preload such that said joint achieves low torque and low end motion of said ball stud.

17. The joint of claim 16, wherein said socket has a spherical floor that corresponds to said spherical seat face of said annular inner bearing.

18. The joint of claim 16, wherein said predetermined time period is approximately seventy-two hours.

19. The joint of claim 16, wherein at least one of a notch and a locator tab are positioned between said outer peripheral surface and said first axial surface of said outer bearing, and the other of said notch and said locator tab are positioned on said inner bearing such that said tab is receivable in said notch to align said lubricant grooves of said inner and outer bearings when said bearings are mated together.

* * * * *